United States Patent [19]

Rubey

[11] Patent Number: 5,323,729
[45] Date of Patent: Jun. 28, 1994

[54] CRUSH INDICATING DEVICE
[75] Inventor: Ulyss R. Rubey, Graham, Tex.
[73] Assignee: Media Recovery, Inc., Graham, Tex.
[21] Appl. No.: 31,601
[22] Filed: Mar. 15, 1993
[51] Int. Cl.$^5$ .................. G01D 11/00; G01D 15/00; G01L 5/00
[52] U.S. Cl. .................. 116/200; 116/201; 116/203
[58] Field of Search .............. 116/1, 200, 201, 203, 116/212, DIG. 34

[56] References Cited
U.S. PATENT DOCUMENTS

| | | | |
|---|---|---|---|
| 2,976,732 | 3/1961 | Hautly | 73/492 |
| 3,221,428 | 12/1965 | Fischler et al. | 40/2.2 |
| 3,369,521 | 2/1968 | Meeder, Jr. | 116/203 |
| 3,515,091 | 6/1970 | Smith | 116/203 |
| 3,782,202 | 1/1974 | Boardman | 73/492 |
| 3,954,011 | 5/1976 | Manske | 116/207 X |
| 4,125,085 | 11/1978 | Rubey | 116/203 |
| 4,793,717 | 12/1988 | Manske | 374/160 |

Primary Examiner—William A. Cuchlinski, Jr.
Assistant Examiner—W. Morris Worth
Attorney, Agent, or Firm—Geoffrey A. Mantooth

[57] ABSTRACT

A crush indicating device is disclosed which is designed to be attached to an object or a container for the purpose of indicating whether the object or container subsequently is subjected to excessive force, acceleration or shock. The indicator device has a contrasting agent reservoir filled with a contrasting agent, an absorbing wick and a compressible wall. The compressible wall extends between the wick and the reservoir, holding them in a fixed apart relationship while the wall is uncompressed. Application of force to the device compresses the wall and brings the wick into contact with the reservoir. The wick absorbs contrasting agent from the reservoir, resulting in a marked visible change in the wick which signifies that excessive force has been applied to the device. A base is located at one end of the wall, supporting the reservoir and providing means to attach the device to an object or container. A transparent cover sheet is located at the opposite end of the wall.

14 Claims, 3 Drawing Sheets

CRUSH INDICATING DEVICE

BACKGROUND OF THE INVENTION

1. Field of the Invention

The present invention relates to devices for detecting when objects such as equipment, articles of manufacture, or shipping containers have been subjected to a mechanical shock.

2. Description of the Prior Art

Many items of manufacture are sensitive to excessive force or shock, and may be damaged if subject to such force or shock. For example, electronic equipment such as televisions and stereos have plastic cabinets and sensitive electronic components. Excessive shock can result in breakage of the cabinet and electronic components.

These items of manufacture are particularly vulnerable to excessive forces when being shipped. For example, when loading or unloading shipping containers, the containers may be dropped from a forklift. Also, when being shipped in a railcar, the railcar may be stopped suddenly, exposing the shipping containers loaded inside to excessive acceleration forces. There is a need for a low cost, reliable device that can be attached to a shipping container and that will provide an indication if the container has been subjected to excessive forces. With such a device, a manufacturer can accurately access fault for damage caused to its goods in transit.

The prior art has seen development of many complex electrical, mechanical and electromechanical devices which measure force applied to a container or object. These devices have tended to be expensive to manufacture, restricting the extensive use of the devices on inexpensive as well as expensive objects A simpler force sensor device is shown in Manske, U.S. Pat. No. 4,793,717. The Manske device can register the impact of a single direct impact. However, it apparently is not sensitive to a distributed surface of pressure such as a box surface. Additionally, the threshold of force needed to activate the Manske device is fixed by its design. Some applications may require different activating forces. For example, sensor devices used on televisions may require a relatively low activating force as compared to sensor devices on more robust equipment. Thus, it is desirable to provide a sensor device that can be manufactured in different sensitivities.

SUMMARY OF THE INVENTION

Accordingly, it is an object of this invention to provide a crush indicating device that is simple and inexpensive and that is activated by either a single direct impact or by distributed pressure.

It is another object of this invention to provide a crush indicating device that lends itself to being easily manufactured in different sensitivities for activating forces.

It is a further object of this invention to provide a crush indicating device that lends itself to automated assembly.

It is a further object of this invention to provide a method for producing a collapsible crush indicator device.

It is yet a further object of this invention to provide a method enabling automated assembly of collapsible crush indicator devices.

In accordance with this invention, there is provided a collapsible crush indicating device for indicating when a force equal to or exceeding a specified threshold of force has been applied to the device. The device is designed to be attached to a container or object. The device has a compressible wall which extends between a contrasting agent reservoir and a contrasting agent absorbing medium. The contrasting agent reservoir contains a contrasting agent which markedly alters the appearance of the contrasting agent absorbing medium when the contrasting agent absorbing medium makes contact with the contrasting agent. When the device is placed upon an object or container the compressible wall is in its non-activated uncompressed state, and a gap extends between the contrasting agent reservoir and the contrasting agent absorbing medium. Application of force to the compressible wall sufficient to compress the wall activates the device by forcing the wall to compress, thereby collapsing the gap and placing the contrasting agent absorbing medium in contact with the contrasting agent reservoir. The contrasting agent alters the appearance of the contrasting agent absorbing medium and thereby indicates that excessive force has been applied to the indicator.

The compressibility of the wall may be varied from device to device so that some devices may be more sensitive to force or shock than others. The compressibility of the wall is a function of the material of which the wall is formed and the physical dimensions such as the thickness of the wall. Variation of these factors allows production of indicating devices of varying sensitivity.

In one aspect of the invention, the device has a base coupled to a first end of the compressible wall adjacent to the contrasting agent reservoir, and a cover coupled to a second end of the wall adjacent to the contrasting agent absorbing pad. The base is comprised of a planar backing sheet overlaid by a pressure sensitive adhesive which is overlaid by a release liner. The release liner is removable so that the pressure sensitive adhesive may be used to attach the device to an object or a container. The cover sheet is transparent and allows viewing of the contrasting agent absorbing sheet so that it may be determined if the device has been activated.

A method for producing a collapsible crush indicating device is also disclosed. A first wall having a contrasting agent absorbing pad (the contrasting agent reservoir above) thereon is provided. A contrasting agent is added to the pad. A compressible spacer is then affixed on the first wall adjacent to the contrasting agent absorbing pad. A second wall having an absorbing wick thereon is then affixed to the compressible spacer so that the spacer extends between the first and second walls and the spacer is adjacent to the absorbing wick. The spacer holds the absorbing wick and the contrasting agent absorbing pad in a fixed apart relationship when in its uncompressed state.

The above method for producing a collapsible crush indicating device may be modified so that many crush indicating devices may be produced by automated assembly. At a first location the contrasting agent may be added to the contrasting agent absorbing pad. At a second location the compressible spacer may be affixed to the first wall, and at a third location the second wall may be affixed to the compressed spacer. Sequential performance of the steps of the method above at each location by automated equipment can be done to produce multiple crush indicator devices in an assembly-line fashion.

DESCRIPTION OF PREFERRED EMBODIMENTS

Figure 1:
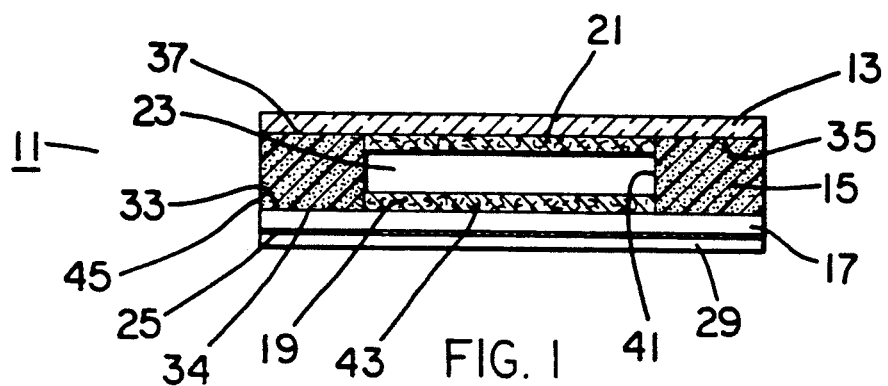
FIG. 1 is a cross-sectional view of the crush indicating device of the invention in accordance with a preferred embodiment.

Referring now to the drawings, in particular FIG. 1, there is shown an indicator device 11 which, in a preferred embodiment, includes a transparent cover 13, a compressible wall 15 or spacer, and a base 17. Located adjacent to the base 17 within the wall 15 is a liquid absorbent, porous pad 19. An indicating liquid saturates the porous pad 19. An indicating wick 21 is adhered to the cover sheet 13 within the wall 15, being spaced apart from the porous pad 19 by a gap 23 when the wall 15 is uncompressed. The indicating liquid is of a contrasting color relative to the wick 21.

The wall 15 is designed to be compressed when a force exceeding a given limit is applied to the device. The gap 23 between the indicating wick 21 and the porous pad 19 collapses when the wall 15 is compressed, placing the indicating wick 21 in contact with the porous pad 19. Some of the indicating liquid transfers from the pad 19 to the wick 21, causing the wick to change color. The indicating wick 21 is viewable through the cover sheet 13. The color change in the indicating wick 21 indicates that excessive force has been applied to the indicator 11.

The base 17 of the indicator 11 provides a non-wettable support for the liquid saturated porous pad 19, and provides an adhesive 25 which may be used to affix the indicator 11 to an object or surface. In a preferred embodiment, the base 17 is a thin polyester (e.g. "MYLAR") having a layer of pressure sensitive adhesive 25 (shown enlarged for clarity) located along one side of the sheet. A release liner 29 overlies the pressure sensitive adhesive layer 25. The release liner 29 is removable so the adhesive 25 may be exposed for adhesion of the indicator 11 to a desired location.

Although a polyester sheet is the preferred base material, other materials may be used to form the base 17. Polytetrafluoroethylene (e.g. "TEFLON") tape that is etched on one side provides a suitable base 17. The etching allows the adhesive 25 to be secured to the tape. The plastic material "KEVLAR" can also be used as a material to form the base 17.

The wall 15 of the indicator 11 extends between the base 17 and the cover sheet 13, maintaining the pad 19 and the wick 21 in a spaced relationship unless excessive force compresses the wall 15. A first end 33 of the wall is joined to the base 17 by a pressure sensitive adhesive 34 located on the base 17. A second end 35 of the wall is coupled to the cover sheet 13 by a pressure sensitive adhesive 37 located on the cover sheet 13.

The wall 15 of the indicator 11 compresses whenever a force that exceeds a predetermined threshold is directed at the wall 15. The indicator 11 is sensitive to forces applied from many directions, as well as forces distributed evenly over the surface of the cover sheet. The height of the wall 15, measured from the first end 33 of the wall to the second end 35 of the wall, is small compared to the overall area of the indicator 11 upon which force may be placed, thereby allowing forces applied from varied directions, as well as evenly distributed forces, to collapse the wall 15 and activate the device. The indicator 11 will respond to forces exerted in a perpendicular direction relative to the orientation of the cover 17 as well as to forces exerted at oblique angles.

The material of which the wall 15 is formed and the physical dimensions of the wall 15 determine the threshold of force necessary to collapse the wall 15 and cause the indicating wick 21 to contact the porous pad 19. Different indicators 11 may be constructed to have different thresholds of collapsing force by varying the material used to construct the wall 15, varying the physical size of the wall 15, or both. One preferred way to vary the physical size of the wall 15 involves changing the thickness of the wall, as measured between the two ends 33, 35. Materials that are more easily compressed and thin wall thicknesses decrease the threshold of collapsing force of the wall 15, while less easily compressed materials and thicker wall thicknesses increase the threshold.

In order to form an indicator 11 having a known threshold of collapsible force, the wall 15 must be formed of a material having known compressibility. In the preferred embodiment, the wall 15 is formed of a foam material. Open cell urethane, a foam available under the trademark "POROX" compressibility of 5 p.s.i., may be used to form the wall 15. Other foams that may be used to form the wall 15 include polyethylene foam, neoprene, and styrofoam. Alternatively, the wall 15 may be formed of corrugated paper instead of foam.

Figure 2:
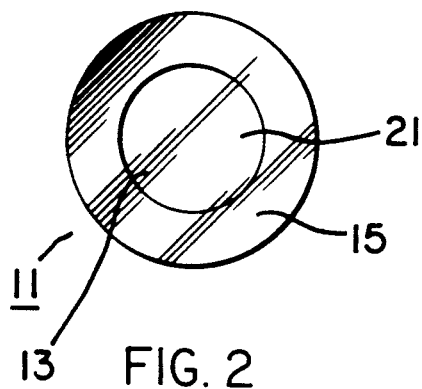
FIG. 2 is a plan view of an unactivated disc-type crush indicating device.
Figure 3:
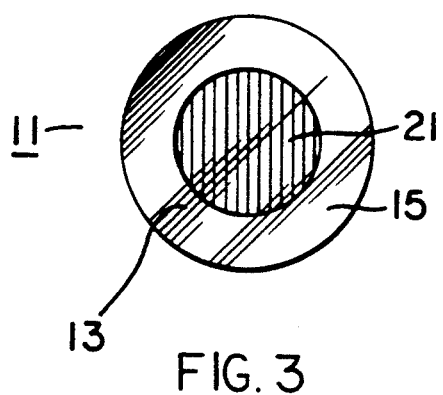
FIG. 3 is a plan view of an activated disc-type crush indicating device.

In a preferred embodiment, the wall 15 is annular in shape. The dimensions of the annular wall 15 are such that the distance across the diameter of the annular wall 15 is much greater than the distance from the first end of the wall 33 to the second end of the wall 37, giving the wall the appearance of a flattened ring. As shown in FIGS. 2 and 3, the indicator 11 has the form of a disc when the wall 15 is annular.

Figure 5:
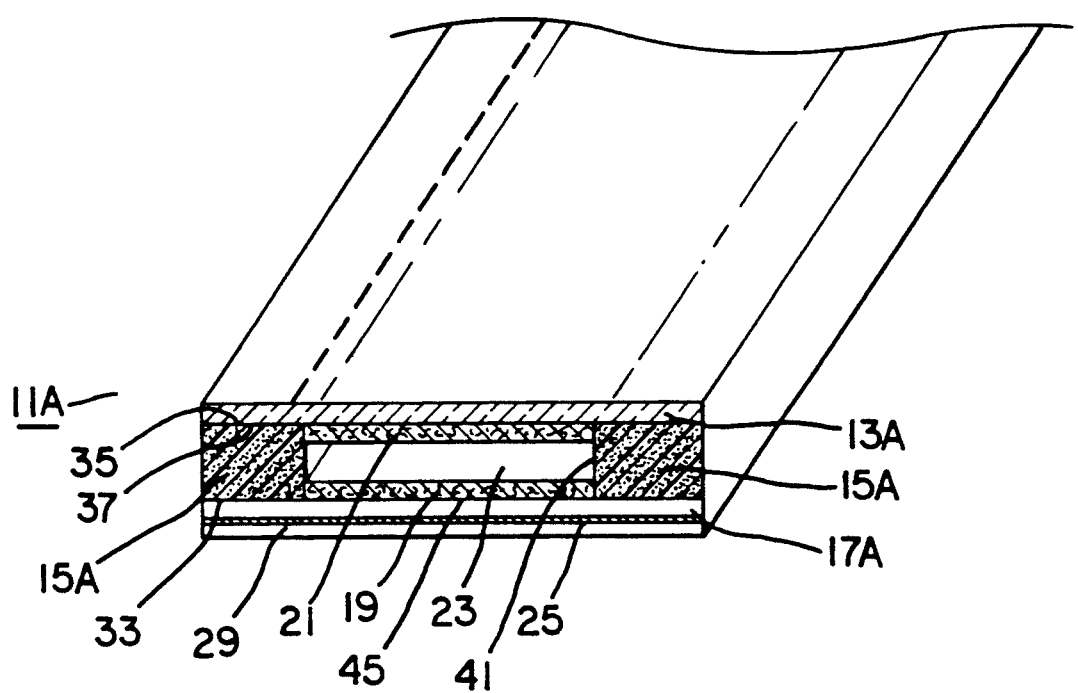
FIG. 5 is an isometric view of a planar sheet-type crush indicating device.

In another preferred embodiment, the wall 15A is comprised of at least two parallel walls (see FIG. 5). The walls 15A are narrow strips. The base 17A and the cover 13A are also strips. The base 17A and the cover 13A extend between the parallel walls and couple the parallel walls together. The height of the parallel walls is small compared to the distance between the walls so that the surface area across the cover 13A and base 17A extending between the walls is much greater than the surface area along the walls themselves. As shown in FIG. 5, the indicator 11A has the form of a planar sheet or strip that may be rolled up and dispensed in a manner analogous to tape.

As shown in FIG. 1, the cover sheet 13 couples to and extends across the second end of the wall 35. The cover sheet 13 is formed of a durable, transparent material so that the cover sheet 13 may withstand force placed upon it, as well as allow the indicating wick 21 to be viewed through the cover sheet 13. In the preferred embodiment, the cover sheet 13 is a sheet of polyester (e.g. "MYLAR"), where a layer of pressure sensitive adhesive extends along one side of the mylar sheet 13. The pressure sensitive adhesive 37 adheres the indicating wick 21 to the cover sheet 13, and couples the cover sheet 13 to the second end 35 of the wall.

The indicating wick 21 and the porous pad 19 are both formed of liquid absorbent material capable of showing a marked change upon absorption of an indicating liquid. In a preferred embodiment, the indicating wick 21 and the porous pad 19 are formed of blotter paper sized to fit neatly within the inner surface 41 of the wall 15. The blotter paper 19, 21 is highly absorbent, and readily absorbs the indicating liquid. The blotter paper 19, 21 is preferably of light coloration, typically white, which changes color markedly upon absorption of the indicating liquid, which contains a colored dye. The colored dye has a coloration significantly different from the color of the blotter paper 19, 21. For example, the blotter paper 19, 21 may be white and the colored dye of the indicating liquid may be red.

The porous pad 19 is saturated with the indicating liquid. The indicating liquid is typically a non-drying mixture of dye and a dye-solvent. The dye gives the indicating liquid color which is easily noticeable on the porous pad 19 and the indicating wick 21. The dye-solvent keeps the mixture from drying out, thereby keeping the indicator 11 operative for a long period of time, and giving the indicator 11 a long shelf life. The dye solvent preferably should have a high surface tension, low vapor pressure and a viscosity that is not significantly affected by ambient temperatures. These characteristics help prevent the mixture from drying out and also help prevent the mixture from creeping up the wall 15 of the indicator 11 and saturating the indicating wick 21 before the wall 15 has been compressed. Ethylene glycol and propylene glycol are suitable dye solvents. Oil based solvents can be used as the dye solvent, but are not preferred over ethylene glycol or propylene glycol because oil based solvents have a tendency to creep up the wall of the indicator, shortening the useful life-span of the indicator. Oil based solvents include: silicone oil, petroleum based oils, peanut oils, and vegetable oils.

The indicating wick 21 and the porous pad 19 are located facing each other within the inner surface 41 of the wall 15. The indicating wick 21 is located adjacent to the cover sheet 13, and is affixed to the cover sheet 13 by the pressure sensitive adhesive 37 of the cover sheet 13. The porous pad 19 is located adjacent to the base 17, and is affixed to the base 17 by a pressure sensitive adhesive 43 that extends along the outer surface of the porous pad 19. In a preferred embodiment, the porous pad 19 has a layer of pressure sensitive adhesive 43 located along one side of the pad 19, which, prior to attachment of the pad 19 to the base 17, is overlaid by a release liner (not shown). The release liner of the pad 19 is peeled away exposing the adhesive layer 43, which is used to affix the porous pad 19 to the base 17.

The indicating wick 21 and the porous pad 19 are separated by the gap 23, which extends between the indicating wick 21 and the porous pad 19 within the inner surface 41 of the wall 15. The gap 23 must be of sufficient size to keep the indicating wick 21 from contacting the porous pad 19 when the wall 15 is in its uncompressed state. The gap 23, however, must not be excessively large, since the indicating wick 21 must come into contact with the porous pad 19 when the wall 15 is compressed and the gap 23 is collapsed, in order to indicate that excessive force has been applied to the indicator 11.

The indicator 11 may have many forms. The configuration of the wall 15 primarily determines the form of the indicator 11, since the cover sheet 13, base 17, porous pad 19, and indicating wick 21 are comprised of materials that may easily be altered to conform to the shape of the wall 15. The wall 15 may have many different geometric configurations, including enclosed configurations, and open configurations where the wall 15 actually consists of two or more individual walls. Two particularly useful forms the indicator 11 may take are a disc shape (see FIGS. 2 and 3) and a planar sheet which may be rolled up and dispensed much like tape (see FIG. 5).

The disc shaped indicator 11 (FIGS. 2 and 3) is sized to enable the indicator 11 to be placed on a wide range of objects. In a preferred embodiment, the outside diameter of the indicator 11 is ½ inch. The annular wall 15 is ⅛ inch wide from the outer surface 45 of the wall to the inner surface 41 of the wall, leaving a ¼ inch diameter gap 23 enclosed by the wall 15. The indicating wick 21 and the porous pad 19 each have a diameter of ¼ inch, enabling the indicating wick 21 and the porous pad 19 to fit snugly in the hole 47. The base 17 and cover sheet 13 are ½ inch diameter discs which fit neatly on the first and second ends of the ½ inch diameter wall, respectively. The thickness of the indicator is slightly greater than 1/16 inch from the outer surface of the base 17 to the cover sheet 13 (see FIG. 1). The wall 15 measures 1/16 inch from the first end 33 of the wall to the second end 35 of the wall. The base 17 measures 6/1000 inch including the release liner 29 and 3/1000 inch without the release liner 29. The cover sheet also measures 3/1000 inch, therefore, the entire indicator 11 including the base 17, wall 15 and cover sheet 13 measures slightly over 1/16 inch from base to cover sheet.

The porous pad 19 and the indicating wick 21 do not add to the overall dimensions of the indicator since they are contained within the cover sheet 13, wall 15 and base 17. The indicating wick 21 extends 3/1000 inch from the cover sheet 13 towards the base 17. The porous pad 19, saturated with indicating liquid, extends 1/100 inch from the base 17 toward the cover sheet 13 The gap 23 extends between the indicating wick 21 and the porous pad 19. Of course, the disc-type indicator 11 is not limited to the dimensions above which are approximations, and may be produced in many sizes.

The planar strip-type indicator 11A of FIG. 5 is sized to allow easy dispensing of the indicator 11, allowing the indicator 11 to be rolled up and dispensed much like a roll of tape. The measurements of the base 17, walls 15, cover sheet 13, porous pad 19 and indicating wick 21 from the base 17 to the cover sheet 13 are the same as the disc-type indicator 11 measurements. Lengthwise, the walls 15, cover sheet 13, and base 17 form a long sheet which may vary in length depending on the manufacture of the indicator 11A, and how much of the indicator 11A has been used. The dimensions of the planar type indicator are not limited to those disclosed above, and the indicator may be produced in many sizes.

Operatively, the indicator 11 is attached to an object or a container for the purpose of indicating whether the object or container has been subjected to excessive shock or force, which may occur during shipping and handling. The indicator 11 is affixed to the object or container by peeling the release liner 29 away from the adhesive surface 25 of the base 17, and pressing the adhesive surface 25 against the object or container.

When the indicator is correctly placed on an object or container, the base 17 is adjacent to the object or container, and the cover sheet 13 faces outward, away from the object or container. Preferably, the indicator 11 is placed in an obvious, easily seen location on the object or container, so that individuals involved in shipping the object or container will be more likely to handle the object with care.

When the compressing force or pressure is removed from the indicator 11, the wall 15 may expand back to its original thickness. This would once again separate the wick 21 from the pad 19. The wick 21 maintains the colored indicating liquid to provide the visual indication. Thus, the wick 21 need only be brought into momentary contact, as with a quick force, to provide an indication.

The indicator 11 is initially in a non-activated state. In the non-activated state, the wall 15 has not been compressed, and the indicating wick 21 is separated from the porous pad 19 by the gap 23. As shown in FIG. 2, the indicating wick 21, as viewed through the transparent cover sheet 13, is the color of the paper used to form the wick 21, preferably white.

Application of force or excessive shock to the indicator 11 activates the indicator 11. The force or shock compresses the wall 15, which collapses the gap 23 between the indicating wick 21 and the porous pad 19 which is saturated with indicating liquid. When the gap 23 collapses, the indicating wick 21 is forced into contact with the porous pad 19. The indicating liquid migrates from the porous pad 19 to the indicating wick 21 due to the concentration gradient between the wick 21 and the pad 19. The colored dye colors the wick 21, providing a visual indication that excessive force or shock has been applied to the indicator 11 as well as the object or container. As shown in FIG. 3, the colored indicating wick 21 may easily be viewed through the transparent cover sheet 13.

Figure 4:
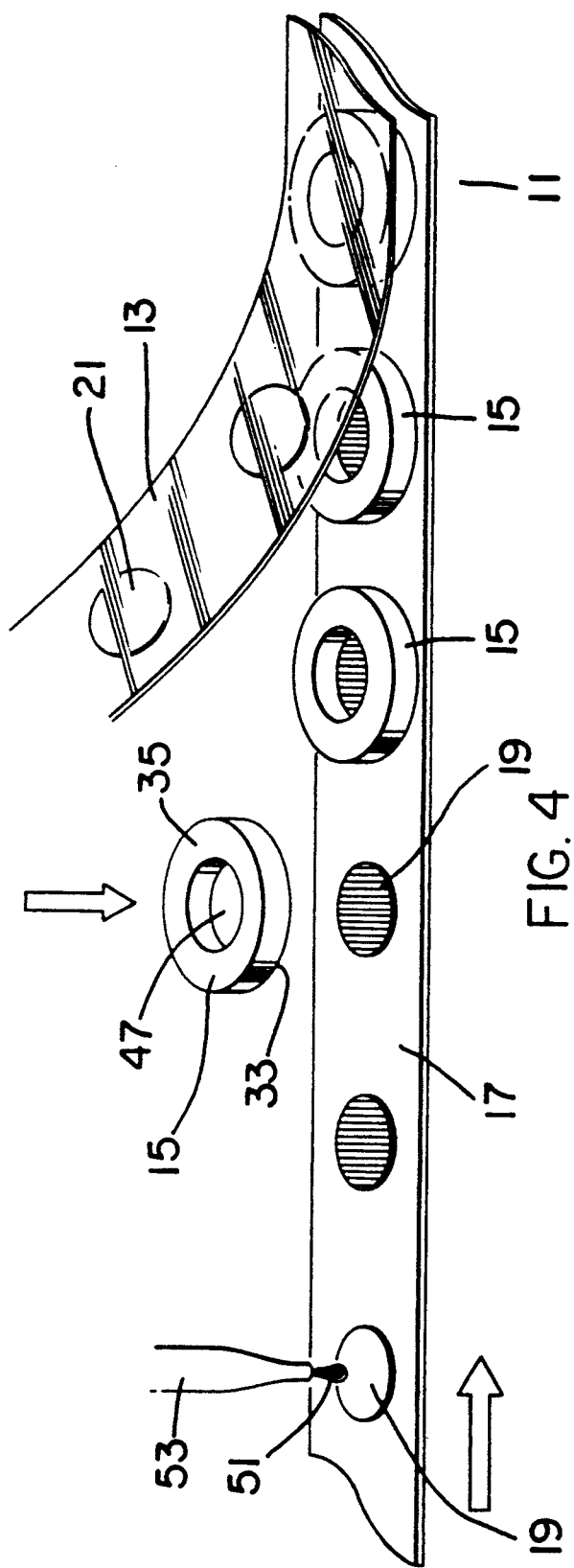
FIG. 4 is a schematic representation of the manufacture of disc-type crush indicating devices.

Referring to FIG. 4, the preferred method of assembling the indicator 11 will now be described. Plural indicators are formed by providing the cover 13 and base 17 in strip form. The base 17 is provided by a strip of "MYLAR". On one side of the base 17 there is a pressure sensitive adhesive overlaid by a release liner. On the other side of the base are discs of blotter paper pads 19 in the center of the base strip.

The base strip is routed through several locations or stations in the manufacturing process. At a first location, the indicating liquid 51 is added to the pads 19. The amount of liquid 51 is metered so as to saturate the pad 19. In addition, the application of the liquid 51, which is in drops, is synchronized with the motion of the base 17 so that a drop of liquid is applied whenever a pad is located beneath the applicator 53.

At a second location along the assembly line, a compressible wall 15 (or walls depending on the configuration of the indicator 11) having adhesive on the first end 33 of the wall is pressed on to the base 17 about the absorbing pad 19.

At a third location, the cover 13 is joined to the wall 15. The cover 13 is in the form of a strip. On one side of the cover are the discs for the wick 21. The cover 13 and attached indicating wick 21 are affixed across the second end 35 of the wall by the adhesive on the cover sheet so that the wall 15 extends about the indicating wick 21, and holds the base 17 and cover sheet 13 in a fixed apart relationship.

The base and cover strips are provided with the blotting paper discs preattached.

The excess portions of the base and cover may be trimmed away. Alternatively, the individual indicators can be torn off when needed by tearing the base and cover.

The description above is intended to be illustrative and not limiting, and should not be interpreted as limiting. The present invention, therefore, should be limited only by the following claims:

I claim:

1. A collapsible crush indicating device, comprising:
    a) a compressible wall having first and second ends, said wall being compressible between said first and second ends;
    b) a contrasting agent reservoir located at said first end of said compressible wall;
    c) a contrasting agent located in said contrasting agent reservoir;
    d) a contrasting agent absorbing medium located at said second end of said compressible wall, said reservoir and said absorbing medium being spaced apart by a gap formed between said first and second ends of said wall when said wall is uncompressed, wherein said compressible wall is adapted to be compressed when force is applied to said compressible wall thereby collapsing said gap and causing said absorbing medium to contact said reservoir so that said absorbing medium absorbs said contrasting agent and thereby indicates that force has been applied to said device.

2. The collapsible crush indicating device of claim 1, further comprising:
    a) a base coupled to said first end of said compressible wall, said reservoir being adjacent to said base;
    b) a transparent cover coupled to said second end of said compressible wall, said absorbing medium being adjacent to said cover, said transparent cover being adapted to permit viewing of said absorbing medium so that it may be determined whether force has been applied to said device sufficient to cause said absorbing medium to absorb liquid from said reservoir;
    c) said reservoir and said absorbing medium being interposed between said base and said cover.

3. The collapsible crush indicating device of claim 2, further comprising a pressure sensitive adhesive in contact with said base, said base being interposed between said adhesive and said wall, and a removable protective release liner overlying said pressure sensitive adhesive, wherein said protective release liner may be removed from said base thereby exposing said pressure sensitive adhesive for adhering said device to an object.

4. The collapsible crush indicating device of claim 3, wherein said compressible wall is formed of a compressible foam material.

5. The collapsible crush indicating device of claim 4, wherein said compressible wall is annular.

6. The collapsible crush indicating device of claim 1, wherein said compressible wall is formed of a compressible foam material.

7. The collapsible crush indicating device of claim 1, wherein said gap comprises a cavity located within said compressible wall, said reservoir and said absorbing medium being located in said cavity.

8. The collapsible crush indicating device of claim 1, wherein said reservoir and said absorbing medium comprise paper.

9. A collapsible crush indicating device, comprising:
a) a flat transparent wall;
b) a flat base wall adapted to be attached to a surface;
c) at least one compressible wall extending between said transparent wall and said base wall;
d) a pad coupled to said base wall adjacent to said compressible wall, said pad containing an indicating liquid;
e) an absorbent wick coupled to said transparent wall adjacent to said compressible wall, said wick being separated by a gap from said pad when said compressible wall is uncompressed, said absorbent wick being adapted to absorb indicating liquid from said pad upon contact with said pad, said absorbent wick coming into contact with said pad when said compressible wall is compressed by force being exerted upon said indicating device.

10. The collapsible crush indicating device of claim 9, wherein said compressible wall is comprised of foam material.

11. The collapsible crush sensor device of claim 10, wherein:
a) said compressible wall is in the shape of an annular ring;
b) said indicating liquid containing pad is adhered to said base wall within said annular ring;
c) said absorbent wick is adhered to said transparent wall within said annular ring.

12. The collapsible crush sensor device of claim 10, wherein:
a) said compressible wall comprises two compressible strip portions that are spaced apart from each other;
b) said indicating liquid containing pad comprises a strip pad that is adhered to said base wall between said compressible wall portions;
c) said absorbent wick comprises a strip wick that is adhered to said transparent wall between said compressible wall portions.

13. A method for producing a collapsible crush indicating device, comprising the steps of:
a) providing a first wall having a contrasting agent absorbing pad located thereon;
b) adding contrasting agent to said contrasting agent absorbing pad;
c) providing at least one compressible spacer;
d) affixing said compressible spacer onto said first wall adjacent to said contrasting agent absorbing pad;
e) providing a second transparent wall having an absorbing wick located thereon;
f) affixing said second wall onto said compressible spacer so that said spacer extends between said first and second walls and said spacer is adjacent to said absorbing wick, holding said absorbing wick and said contrasting agent absorbing pad in a fixed apart relationship.

14. A method for producing a collapsible crush indicating device, comprising the steps of:
a) providing a first sheet having at least one contrasting agent absorbing pad located thereon;
b) at a first location adding contrasting agent to a contrasting agent absorbing pad;
c) at a second location, affixing a compressible spacer on said first sheet adjacent to said contrasting agent absorbing pad that has received contrasting agent thereon;
d) at a third location, affixing a second transparent sheet having an indicator wick thereon onto said compressible spacer that has been affixed to said first sheet so that said compressible spacer extends between said first and second sheets and said indicator wick lies adjacent to said compressible spacer.

* * * * *